Feb. 11, 1958 P. ORR ET AL 2,822,705
LUBRICATING SYSTEM IN TRANSMISSION AND REDUCTION DRIVE
Filed July 9, 1952 3 Sheets-Sheet 1
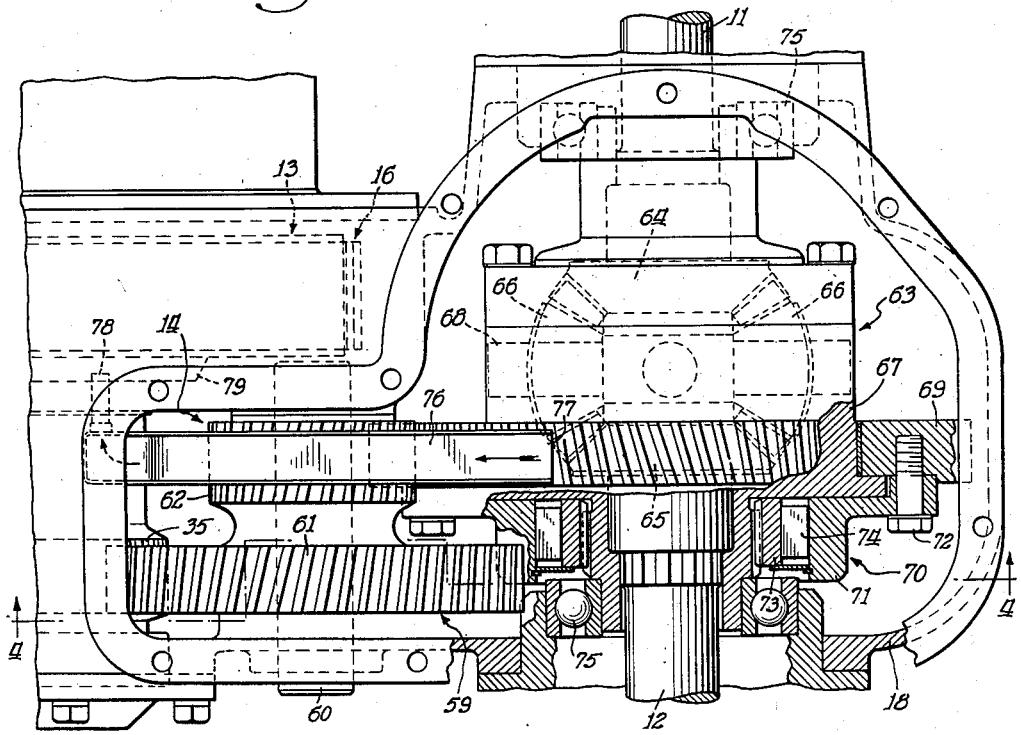
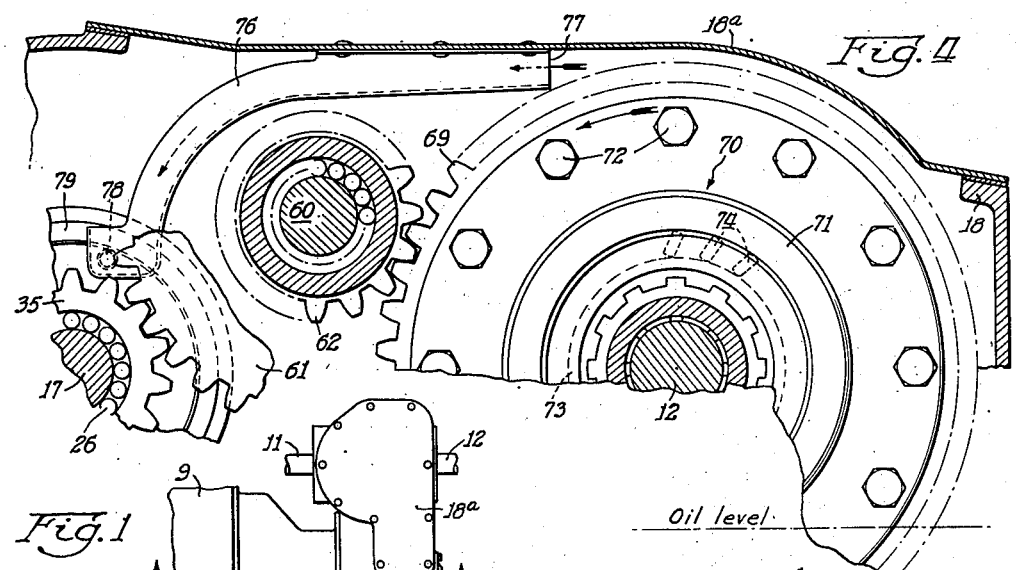
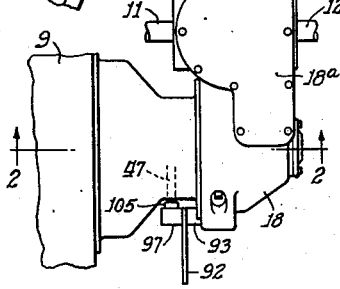
Inventors:
Palmer Orr and
Donald W. Kelbel
By: Keith J. Blewer Atty.

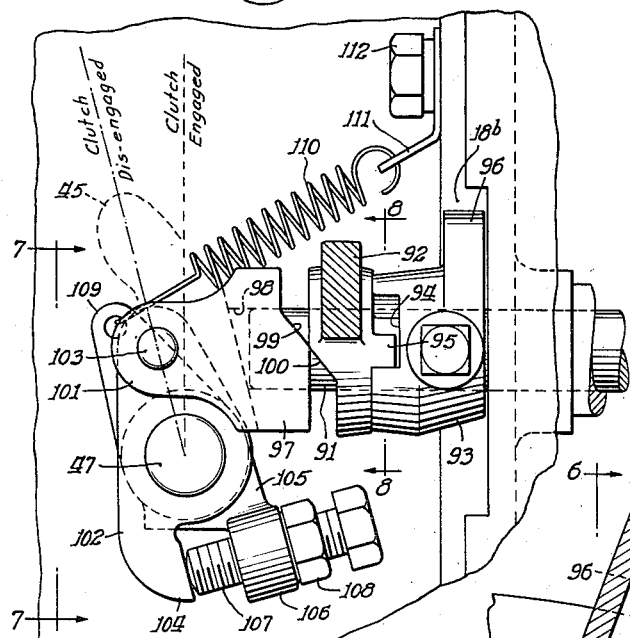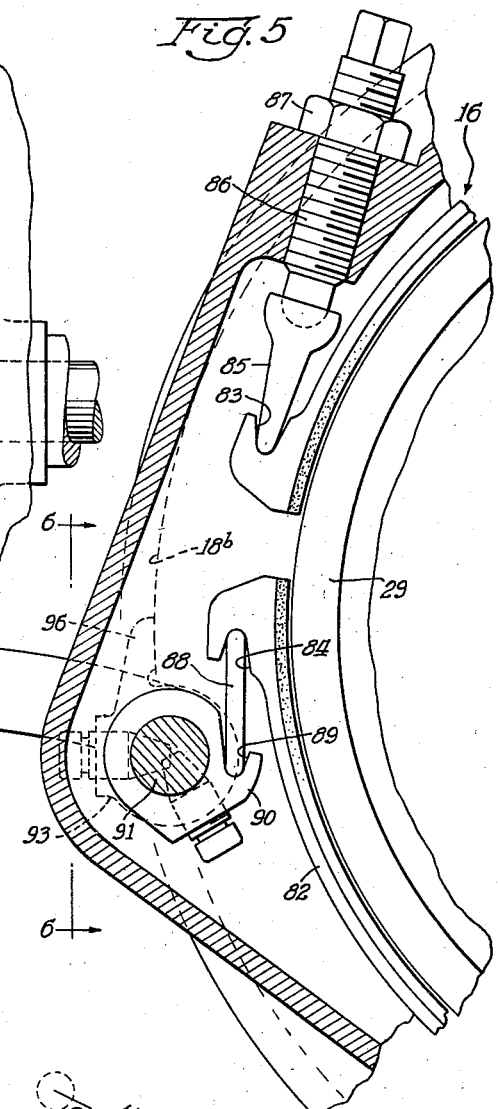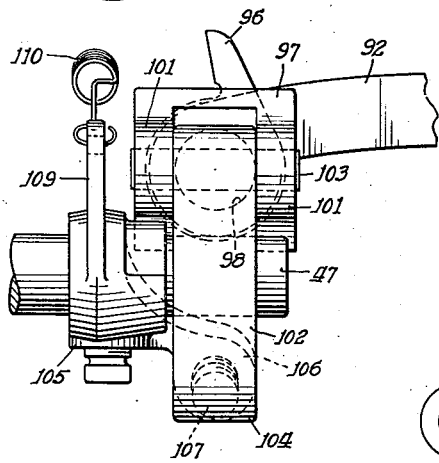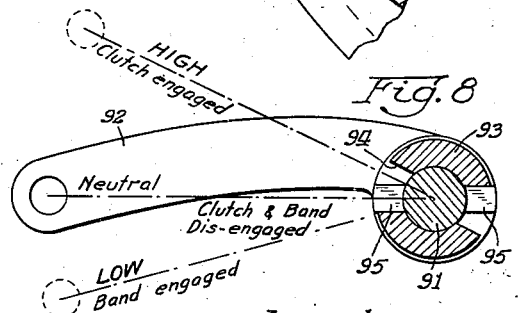

ary Feb. 11, 1958

United States Patent Office 2,822,705
Patented Feb. 11, 1958

2,822,705

LUBRICATING SYSTEM IN TRANSMISSION AND REDUCTION DRIVE

Palmer Orr and Donald W. Kelbel, Muncie, Ind., assignors to Borg-Warner Corporation, Chicago, Ill., a corporation of Illinois Application July 9, 1952, Serial No. 297,884

1 Claim. (Cl. 74—695)

Our invention relates to transmissions, and particularly to transmissions of the type which are suitable for driving road vehicles.

It is an object of the present invention to provide an improved transmission of this type which provides two speed ratios both of which cause a rotation of the transmission driven shaft at a lower speed than that of the drive shaft.

It is another object of the invention to provide an improved controlling mechanism for the transmission including a single lever which when moved into one position engages a brake for completing the lower speed ratio through the transmission and when moved into another position disengages the brake and engages a clutch for completing the higher speed ratio through the transmission.

It is a further object of the invention to provide a one-way clutch in the transmission which releases when the vehicle is towed or pushed so that the other parts in the transmission are not necessarily rotated on such movement of the vehicle.

It is another object of the invention to provide an improved oiling system for the transmission, and particularly for planet gears within the transmission, which comprises means for transferring lubricant thrown off of a large gear to the planet gears.

The invention consists of the novel constructions, arrangements and devices to be hereinafter described and claimed for carrying out the above stated objects and such other objects as will appear from the following description of a preferred embodiment of the invention, illustrated with reference to the accompanying drawings, wherein:

Fig. 1 is a plan view of a transmission embodying the principles of the invention and shown connected to the vehicle driving motor;

Fig. 3 is a plan view of a portion of the transmission with a cover of the transmission casing removed to reveal internal parts of the transmission;

Fig. 4 is a sectional view taken on lines 4—4 of Figs. 2 and 3;

Fig. 5 is a fragmentary sectional view on an enlarged scale taken on line 5—5 of Fig. 2 with a control lever of the transmission shown in clutch and brake disengaged position;

Fig. 6 is a side view of the portion of the transmission illustrated in Fig. 5 and taken from line 6—6 of Fig. 5;

Fig. 7 is an end view of the mechanism illustrated in Fig. 6 and taken from line 7—7 of Fig. 6; and Fig. 8 is a view of the control lever for the transmission illustrated in the same manner and from the same direction as in Fig. 5.

Like characters of reference designate like parts in the several views.

Figure 2:
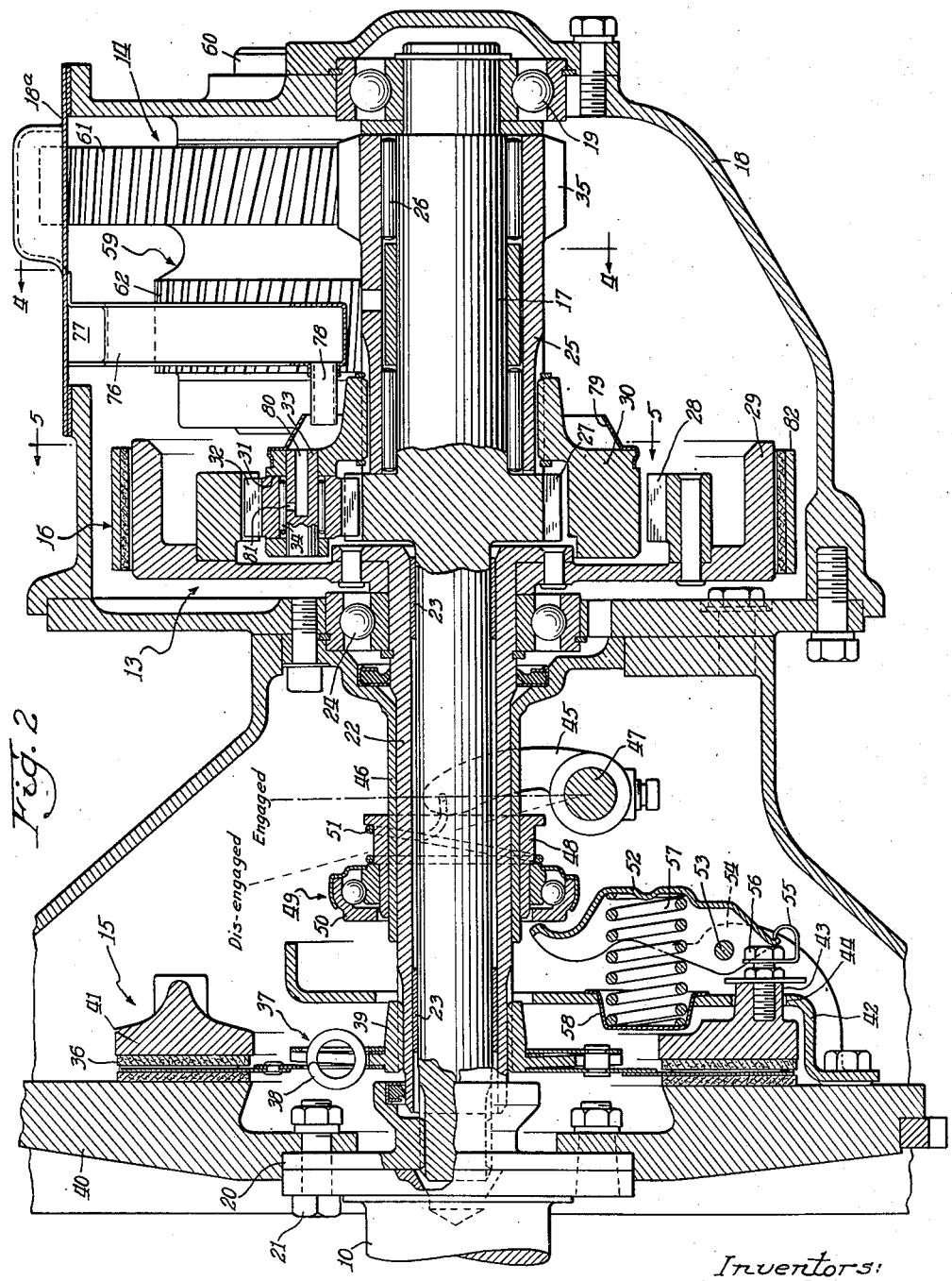
Fig. 2 is a sectional view on an enlarged scale of the transmission taken on line 2—2 of Fig. 1 with the clutch of the transmission in engaged condition.

Referring now to the drawings, the transmission as illustrated in Fig. 1 is shown as being driven from a motor 9 installed along with the transmission in a road vehicle. The transmission has a drive or input shaft 10 and two driven or output shafts 11 and 12. The input shaft 10 is connected with the engine 9 of the vehicle and the output shafts 11 and 12 may be connected with opposite driving road wheels of the vehicle. The transmission comprises, in general, a primary, planetary type, gear reduction unit 13 and a secondary, countershaft type, gear reduction 14, a friction clutch assembly 15 for connecting an element of the planetary unit 13 with the drive shaft 10 and a brake 16 for braking an element of the planetary unit 13. The primary gear reduction unit 13 comprises a shaft 17 rotatably disposed within the casing 18 of the transmission by means of a ball bearing 19 and connected to rotate with the drive shaft 10 by means of an annular member 20 fixed to the shaft 10 by means of bolts 21 and splined on the shaft 17. A sleeve shaft 22 is rotatably disposed on the shaft 17 by means of sleeve-like bearings 23, and the shaft 22 is rotatably disposed within the casing 18 by means of a ball bearing 24. A sleeve shaft 25 is rotatably disposed on the shaft 17 by means of bearing needles 26. The casing 18 has a cover 18a which is removed in the Fig. 3 plan view for showing internal parts of the transmission.

The planetary gearing 13 comprises a sun gear 27 formed on the shaft 17, a ring gear 28 fixed with respect to an annular drum 29 that is in turn fixed to the shaft 22 and a planet gear carrier 30 splined to the shaft 25. The carrier 30 is provided with a plurality of apertures 31 therethrough for receiving planet gear pinions 32. Each of the pinions 32 is rotatably mounted in an aperture 31 by means of a stub pinion shaft 33, extending through the aperture and fixed within the carrier 30, and bearing needles 34 disposed between the shaft 33 and the planet gear pinion 32. Each of the pinions 32 is in mesh both with the ring gear 28 and also with the sun gear 27. A gear 35 is formed on the shaft 25 and functions as the output gear of the planetary gearing 13.

The clutch mechanism 15 comprises a clutch disc 36 having a vibration dampener 37 of any suitable construction, which includes springs 38, disposed effectively between the disc 36 and the hub 39 for the disc 36. The clutch disc 36 is disposed between a flywheel 40 which is fixed by means of the bolts 21 to the shaft 10 and a pressure plate 41. The pressure plate 41 is movable toward and away from the flywheel 40 so as to clamp the clutch disc 36 between it and the flywheel, and the pressure plate 41 is disposed to rotate along with the flywheel 40 by means of a clutch housing 42. The clutch housing 42 is fixed to rotate with the flywheel 40, and the pressure plate 41 has protruding portions 43 extending through openings 44 in the housing 42 for rotatably fixing the pressure plate 41 to rotate along with the housing 42 and thereby with the flywheel 40.

The clutch mechanism 15 is released by means of a U-shaped release lever 45 extending around and embracing a sleeve 46 fixed with respect to the casing 18. The lever 45 is fixed on a shaft 47. A sleeve 48 is slidably disposed on the sleeve 46, and a ball bearing 49 comprising an outer race 50 is fixed on the sleeve 48. A spring 51 extends around the sleeve 48 and through openings in the ends of the lever 45 for causing the sleeve 48 to move along with the lever 45 when the lever 45 rotates in the clockwise direction as seen in Fig. 2. The outer race 50 of the ball bearing is adapted to contact the inner end of each of a plurality of levers 52 which are pivoted to the clutch housing 42 at 53 in bosses 54 formed on the housing 42. The outer end of each of the levers 52 is connected with the pressure plate 41 by means of a clip 55 fixed to the pressure plate 41 by means of a stud 56 extending into the pressure plate, and the clips 55 overlie the outer ends of the levers 52, as shown. A compression spring 57 is disposed between each of the levers 52 and a spring retainer 58 carried by the housing 42.

The secondary gear train 14 comprises a gear cluster 59 rotatably mounted on a countershaft 60 fixed within the transmission casing 18. The gear cluster is formed with a relatively large gear 61 and a relatively small gear 62. The gear 61 is in mesh with the gear 35.

The secondary reduction gear train comprises a differential unit 63 having two beveled gears 64 and 65 mounted respectively on the shafts 11 and 12. Beveled idler gears 66 are in mesh with the gears 64 and 65 and are rotatably mounted in a carrier 67 by means of pinion shafts 68. A relatively large ring gear 69 is rotatably mounted on the carrier 67 and meshes with the relatively small gear 62 on the gear cluster 59.

A freewheeling clutch unit 70 is disposed between the ring gear 69 and the gear carrier 67. The one-way clutch unit 70 comprises an outer member 71 fixed with respect to the ring gear 69 by means of screws 72. The one-way clutch unit 70 comprises also an inner member 73 splined to the carrier 67 and a puurality of tiltable sprags 74 between the members 71 and 73. The gear carrier 67 is rotatably mounted within the transmission casing 18 by means of ball bearings 75, and the remainder of the differential gear unit 63 is thus also rotatably mounted with respect to the casing 18.

A lubricating arrangement is provided for the planet gear pinions 32 which comprises a trough 76 fixed to the casing cover 18a. The trough has its inlet end 77 adjacent the ring gear 69, and the trough leads to the vicinity of the carrier 30 and has an outlet conduit 78 at this point. The planet gear carrier 30 is provided with an annular sheet material oil collector 79 affixed thereto, and the pinion shafts 33 are each provided with a longitudinally extending central passage 80 and a radially extending passage 81 in communication with the passage 80. The passages 80 are in communication with the outlet conduit 78 by means of the oil connector 79.

The brake 16 comprises a brake band 82 surrounding the brake drum 29. The brake band 82 is provided with tangentially extending recesses 83 and 84 in its ends, and a stud 85 extends into the recess 83 in one end of the band 82 and is disposed on and fits over the end of an adjustment screw 86 extending through the transmission casing 18. A lock nut 87 is provided for locking the screw 86 against rotation in the casing 18. The other end of the band 82 may be moved for tightening the band on the drum 29 by means of a strut 88 disposed in the recess 84 and also disposed in a slot 89 provided in a force applying lever 90. The lever 90 is fixed on a shaft 91 which is rotatably mounted in the transmission casing 18.

The shaft 91 is rotated by means of a lever 92 rotatably mounted on the shaft. A collar 93 is fixed on the shaft 91, and the collar 93 has a slot 94 in one end for loosely receiving a projection in the form of a tab 95 formed on the lever 92. The collar 93 is provided with a tang 96 which is adapted to contact a portion 18b of the casing 18 preventing more than a limited rotation of the shaft 91.

A force transmitting member 97 has a longitudinally extending opening 98 therein and fits on the shaft 91. The member 97 has a slanted cam face 99, and the lever 92 also has a cam face 100 adapted to cooperate with the face 99, as will be hereinafter described. The force transmitting member 97 is provided with two trunnions 101 receiving between them a lever 102 which is rotatably mounted on the clutch throw out shaft 47. The force transmitting member 97 and the lever 102 are pivotally connected by means of a pin 103. The lever 102 is provided with an outwardly extending tang portion 104 for purposes presently to be described.

A lever 105 is fixed to the shaft 47 and is provided with an outwardly extending arm portion 106. A screw 107 extends through the arm portion 106 and is adapted to contact the tang portion 104 for moving the lever 105 from the lever 102, as will be hereinafter described. A lock nut 108 is disposed on the screw 107 for fixing the screw 107 within the arm portion 106. The lever 105 is provided with a second arm portion 109, and a spring 110 extends between the arm portion 109 and a lug 111 fixed to the transmission casing by means of a cap screw 112.

The transmission provides two speed ratios between the drive shaft 10 and the output shafts 11 and 12, and the drive through the transmission is controlled by means of the lever 92. The lever 92 has three positions which we have indicated in Fig. 8, namely, a neutral position in which both the clutch 15 and the brake 16, are disengaged, a low speed position in which the brake 16 only is engaged and a high speed position in which only the clutch 15 is engaged. The lever 92 is shown in its neutral position in the various figures, and in this position, the cam faces 100 and 99 are in contact at the high points on the cam faces, so that the thrust member 97 is held at the outer limit of its movement on the shaft 91. The thrust member 97, through its pivotal connection with the lever 102, holds the lever 102 in its Fig. 6 position at the limit of its counterclockwise movement as seen in this figure, and, through the screw 107, the lever 105 is similarly held in a position at the limit of its counterclockwise rotation and against the action of the spring 110. The shaft 47 is fixed with respect to the lever 105, and the lever 45 fixed on the shaft 47 presses against the sleeve 48 and pulls the pressure plate 41 out of engagement with the clutch disc 36 through the ball bearing 49, the levers 52 and the lugs 55, the levers 52 being held depressed by means of the ball bearing 49 against the action of the springs 57. The cam portions 100 and 99 of the lever 92 and of the thrust member 97, respectively, through the linkage just described, holds the clutch 15 disengaged.

With the lever 92 in its neutral position, the shaft 91 is in its position in which it is illustrated in Fig. 5 with the tang 96 of the collar 93 in contact with the casing portion 18b, the inherent spring action of the band 82 holding the shaft 91 in this position through the strut 88, with the band 82 being disengaged from the drum 29. The tab 95 is at one end of the slot 94 in the collar 93 but in its illustrated position has no effect to move the tang 96 away from the face 18b of the transmission casing.

The high forward drive power train through the transmission may be completed by moving the lever 92 in a clockwise direction as seen in Fig. 8 into its high, clutch engaged, position. This movement of the lever 92 permits the thrust member 97 to move to the right as seen in Fig. 6 on the shaft 91, with the cam surface 99 in contact with and traveling along the cam surface 100 of the lever 92. During this rotation of the lever 92, the tab 95 travels within the slot 94 of the collar 93 and causes no movement of the collar 93 and the shaft 91 on which the collar 93 is fixed. The spring 110 tends to rotate the lever 105 and thereby the shaft 47 in a clockwise direction as seen in Fig. 6, and this clockwise rotation of the lever 105 together with the shaft 47 takes place on this movement of the lever 92, with the screw 107 pressing against the tang 104 on the lever 102 and moving the lever 102 in a clockwise direction and the thrust member 97 to the right as seen in Fig. 6. The shaft 47 when thus rotated, swings the lever 45 fixed on the shaft 47 also in this direction causing the sleeve 48 to be moved to the right as seen in Fig. 2 to release pressure on the inner ends of the levers 52 and move the ball race 50 out of engagement with the levers 52. The springs 57 acting on the levers 52 move the levers in a clockwise direction as seen in Fig. 2 to the limit of their movements, in which the outer ends of the levers 52 bear with pressure due to the springs 57 on the studs 56 to hold the pressure plate 41 in forceful engagement with the clutch disc 36, the disc being gripped between the plate 41 and flywheel 40 and the clutch 15 being fully engaged. During clockwise rotation of the shaft 47 as seen in Fig. 2, the springs 57, during a first phase, rotate the levers 52 about their pivotal connections 53, with the inner ends of the levers moving toward the right as seen in Fig. 2, to move the pressure plate 41 into engagement with the clutch disc 36, the levers 52 acting on and through the studs 56. When the clutch 15 is completely engaged, movement of the levers 52 stops. Continued rotation of the shaft 47 in a clockwise direction due to the action of the spring 110, in a second phase, causes continued movement of the sleeve 48 to the right to move the outer race 50 of the ball bearing 49 out of engagement with the inner ends of the levers 52. The sleeve 48 is held in engagement with the lever 45 due to the action of the spring 51 encircling the sleeve 48 and fixed to the ends of the lever 45.

With the clutch 15 engaged, the planetary gear set is locked up and the sleeve shaft 25 and gear 35 are driven at a one to one speed ratio with respect to the drive shaft 10. The shaft 17 is permanently connected to rotate with the shaft 10 by means of the annular member 20, and the clutch 15 when engaged connects the shaft 10 through the flywheel 40, the clutch driven disc 36, the vibration dampener 37, the sleeve 22, and the drum 29 with the ring gear 28 of the planetary gear set 13. The sun gear 27 is formed on the shaft 17, so that both the ring gear 28 and the sun gear 27 rotate along with the drive shaft 10. This causes all of the parts of the planetary gearing 13 to rotate along with and at the same speed as the drive shaft 10; and the carrier 30, the shaft 25 and the gear 35 are thus driven at a one to one drive with respect to the shaft 10.

The gear carrier 67 is driven at a definite reduced fixed speed ratio with respect to the gear 35, and assuming that there is no relative rotation between the shafts 11 and 12, these shafts also are driven at this fixed speed ratio with respect to the gear 35. The gear 35 drives the gear cluster 59 and more particularly, the gear 61 in mesh with the gear 35, and the relatively small gear 62 of the gear cluster fixed with respect to the gear 61 drives the ring gear 69 in mesh with the gear 62. Due to the relative sizes of the gears 35, 61, 62 and 69, the gear 69 rotates at a lower speed than the gear 35, the countershaft gearing 14 constituting a reduced speed ratio power train. The gear 69 drives the carrier 67 through the one-way clutch 70 and the sprags 74 engage between the inner and outer members 73 and 71 when the ring gear 69 rotates in the direction indicated by the arrow in Fig. 4, which is its direction of rotation for all drives through the transmission. The gear carrier 67 drives the shaft 11 through the meshing gearing 66 and 64, and the carrier 67 drives the shaft 12 through the meshing gears 66 and 65. Assuming that there is no relative rotation between the shafts 11 and 12, in accordance with well-known principles of differential gearing, the shafts 11 and 12 will rotate alone with and at the same speed as the carrier 67.

When the ratio changing lever 92 is returned from its high position to its neutral position, the cam surface 100 moves with respect to the cam surface 99 and moves the thrust member 97 to the left as seen in Fig. 6 on the shaft 91. The thrust member 97 through the pin 103 rotates the lever 102 in the counterclockwise direction as seen in Fig. 6 and also rotates the lever 105 in this direction through the screw 107 abutting the tang 104 on the lever 102. The lever 105 is fixed on the shaft 47 and causes the lever 45 to rotate counterclockwise as seen in Fig. 2 and move the sleeve 48 and ball bearing 49 to the left. The outer race 50 of the ball bearing 49 contacts the release levers 52 of the clutch to move the pressure plate 41 away from the flywheel 40 through the clips 55 overlying the levers 53, this movement of the levers 52 being against the action of the springs 57. This movement of the clutch plate 41 disengages the clutch 15, and the transmission is in neutral condition.

When the control lever 92 is rotated still further as seen in Fig. 8 in the counterclockwise direction, from its neutral to its low, band engaged position, the tabs 95 act on ends of the slots 94 and rotate the collar 93 and the shaft 91 in the counterclockwise direction as seen in Fig. 5. The tang 96 on the collar 93 is thus moved away from the surface 18b of the transmission casing 18, and the collar 90 rotates along with the shaft 91 in the counterclockwise direction, as seen in Fig. 5, and acts through the strut 88 on one end of the band 82 to engage the band on the brake drum 29. The other end of the brake drum is held fixed with respect to the transmission casing by means of the strut 85 disposed in the slot 83 and held against movement with respect to the transmission case by means of the set screw 86. The brake 16 is thue engaged. The lever 92, being rotated in the direction opposite to that causing coaction between the cam faces 99 and 100, holds the thrust member 97 in the position in which it is illustrated in Fig. 6, and, through the linkage between the thrust member 97 and the clutch 15, holds the clutch 15 disengaged.

With the clutch 15 being disengaged and the brake 16 being engaged, the planetary gearing 13 is driven solely through the shaft 17 permanently connected to the drive shaft 10 through the annular member 20. The ring gear 28, which is fixed to the drum 29, is held against rotation by the brake 16, and, on rotation of the sun gear 27 along with the drive shaft 10, the planet gears 32 rotate within the stationary ring gear 28 and carry along with them the gear carrier 30 at a reduced speed with respect to the shaft 17. The gear carrier 30 is fixed to the shaft 25 on which is formed the input gear 35 of the secondary countershaft reduction gear train, and the ring gear 69 and shafts 11 and 12 are rotated at the fixed reduction ratio provided by the countershaft gearing 14 with respect to the gear 35. The over-all speed ratio between the output shafts 11 and 12, and the input shaft 10, is, of course, the product of the reduction ratios provided by the reduction gear units 13 and 14 since the units 13 and 14 are connected in tandem or series. The output shafts 11 and 12 are thus driven at a low speed ratio with respect to the shaft 10, it being understood, however, that both the high and low speed ratios are reduction ratios due to the fixed reduction provided by the secondary gear set 14.

When the transmission control lever 92 is moved back from its low, band engaged, position to its neutral position, the collar 93 and shaft 91 rotate back into their positions in which they are illustrated in Fig. 5 with the tang 96 on the collar 93 resting against the portion 18b of the transmission casing 18. This rotation of the collar 93 and the shaft 91, on which the collar is fixed, is due to the inherent resiliency of the band 82 acting through the strut 88 on the collar 90, also fixed to the shaft 91. The clutch 15 remains disengaged, and the brake 16 is disengaged due to this return movement of the lever 92, and the transmission is again in neutral condition. Force is multiplied between the selector lever 92 and both the brake 16 and the clutch 15. The force multiplying mechanism between the lever 92 and the brake 16 includes the collar 90 having its recess 89 located relatively close to the center of the shaft 91 as compared to the relatively long length of the lever 92 connected with the collar through the lost motion connection comprising the projection 95 movable in the slot 94. Due to the relatively long length of the lever 92 as compared with the relatively short distance between the recess 89 and the center of the shaft 91, the force exerted on one end of the band 82 through the strut 88 is multiplied materially as compared with the force exerted on the lever 92. The cam surfaces 99 and 100, connected by the levers 102 and 105, the shaft 47, the lever 45 and the levers 52 with the clutch 15, constitute the force multiplying mechanism for disengaging the clutch 15 against the springs 57 with a relatively small force exerted on the lever 92 in comparison with the relatively large force required for moving the pressure plate 41 away from the fly wheel 40.

The planet gears 32, and particularly the bearing needles 34 for the gears 32, are lubricated by oil thrown off the ring gear 69. Oil is disposed in the lower portion of the transmission casing 18, as indicated in Fig. 4, and the oil is carried on the periphery of the gear 69 as it rotates. Some of this oil is thrown off the gear 69 due to centrifugal force and enters the trough 76 at its end 77 and flows through the trough to its outlet 78. The oil flowing through the outlet 78 enters the frusto-conical oil collector 79 and flows from within the collector through the passages 80 and 81 to the bearing needles 34. The needles 34 are thus lubricated.

The transmission is designed to be used within an automotive vehicle with the shafts 11 and 12 connected to opposite driving road wheels of the vehicle and the shaft 10 connected with the vehicle motor 9. At times it may be desirable to tow the vehicle as by a tractor, and in this case, the one-way clutch 70 releases, allowing the driving road wheels of the vehicle, as well as the parts of the differential gearing 63, to rotate free of the remaining gears in the transmission, including the gears 69, 62, 61 and 35, as well as the parts of the gearing 13 and the clutch 15.

The illustrated transmission advantageously provides low and high speed ratios, each of which is less than a one to one ratio, for driving a vehicle in which the transmission is installed. The transmission includes the one-way clutch 70 allowing the vehicle to be towed or pushed without causing rotation of other parts in the transmission. The transmission is advantageously controlled by means of a single control lever 92 which when moved in one direction functions to engage the brake 16 and when moved in the opposite direction, functions to engage the clutch 15. We have also provided an improved lubrication system for the planet gears 32 comprising the trough 76 into which oil is thrown by means of the large output ring gear 69 that is immersed beneath the oil level in the casing 18.

We wish it to be understood that our invention is not to be limited to the specific constructions and arrangements shown and described, except only insofar as the claim may be so limited, as it will be understood to those skilled in the art that changes may be made without departing from the principles of the invention.

We claim:

In transmission mechanism, a transmission housing, a first shaft rotatably disposed within said housing, a plurality of planet gears rotatable about axes radially spaced from said shaft, a planet gear carrier fixed on said shaft and carrying pinion shafts on which said planet gears are rotatably mounted, each said pinion shaft being provided with a passage extending from one end of the shaft to the exterior peripheral bearing surface of the shaft, a second shaft rotatably disposed in said housing disposed in a parallel and side by side relationship with said first-named shaft, a reduction gear train between said first and second shafts comprising a gear carried by said first shaft which is the input gear of said reduction gear train, and a gear carried by said second shaft which is the output gear of said reduction gear train, said transmission housing being adapted to contain a body of liquid lubricant and said output gear being disposed in said lubricant, and a trough extending transversely between said first and second shafts in a tangential relationship to said output gear and having an inlet end adjacent the upper periphery of said output gear to collect liquid thrown off said output gear by centrifugal force and having an outlet end adjacent the passages in said pinion shafts for delivering lubricant thereto and thereby within said planet gears.

References Cited in the file of this patent

UNITED STATES PATENTS

| | | |
|---|---|---|
| 558,420 | Regan | Apr. 14, 1896 |
| 695,894 | Torbensen | Mar. 18, 1902 |
| 704,699 | Furguson | July 15, 1902 |
| 894,878 | Cutler | Aug. 4, 1908 |
| 1,220,811 | Alquist | Mar. 27, 1917 |
| 1,404,081 | Anvil | Jan. 17, 1922 |
| 1,511,156 | Bolgiano | Oct. 7, 1924 |
| 1,624,756 | Nobstedt | Apr. 12, 1927 |
| 1,918,200 | Wert | July 11, 1933 |
| 1,955,103 | Snow et al. | Apr. 17, 1934 |
| 2,027,012 | Barnes | Jan. 7, 1936 |
| 2,312,263 | Ormsby | Feb. 23, 1943 |
| 2,314,664 | Shenstone | Mar. 23, 1943 |
| 2,408,336 | Orr | Sept. 24, 1946 |
| 2,518,837 | Taylor | Aug. 15, 1950 |
| 2,587,015 | Walter | Feb. 26, 1952 |
| 2,699,850 | Rakos | Jan. 18, 1955 |

FOREIGN PATENTS

| | | |
|---|---|---|
| 186,411 | France | Oct. 15, 1887 |
| 894,029 | France | Dec. 12, 1944 |